(12) United States Patent
Patel

(10) Patent No.: US 11,293,601 B2
(45) Date of Patent: Apr. 5, 2022

(54) LIGHT PANEL REPLACEMENT SYSTEM FOR FLUORESCENT LIGHTS

(71) Applicant: Krut LED, LLC, Anderson, SC (US)

(72) Inventor: Ishavarbhai Patel, Pendleton, SC (US)

(73) Assignee: KRUT LED, LLC, Anderson, SC (US)

( * ) Notice: Subject to any disclaimer, the term of this patent is extended or adjusted under 35 U.S.C. 154(b) by 628 days.

(21) Appl. No.: 16/278,852

(22) Filed: Feb. 19, 2019

(65) Prior Publication Data
US 2019/0257481 A1   Aug. 22, 2019

Related U.S. Application Data

(60) Provisional application No. 62/632,342, filed on Feb. 19, 2018.

(51) Int. Cl.
| | |
|---|---|
| *F21K 9/60* | (2016.01) |
| *F21V 3/04* | (2018.01) |
| *F21V 23/00* | (2015.01) |
| *F21Y 103/20* | (2016.01) |
| *F21Y 115/10* | (2016.01) |

(52) U.S. Cl.
CPC ............... *F21K 9/60* (2016.08); *F21V 3/049* (2013.01); *F21V 23/001* (2013.01); *F21Y 2103/20* (2016.08); *F21Y 2115/10* (2016.08)

(58) Field of Classification Search
CPC .... F21S 8/026; F21S 2/005; F21S 8/04; F21S 8/043; F21V 21/048; F21V 23/002; F21V 17/107; F21V 23/06
See application file for complete search history.

(56) References Cited

U.S. PATENT DOCUMENTS

| | | | |
|---|---|---|---|
| 7,954,975 B2* | 6/2011 | Zhou ....................... | F21S 8/026 362/147 |
| 2010/0289428 A1 | 11/2010 | Fraizer et al. | |
| 2012/0320627 A1 | 12/2012 | Araki et al. | |
| 2013/0027915 A1* | 1/2013 | Caferro ................. | F21V 29/507 362/147 |

* cited by examiner

*Primary Examiner* — William J Carter
(74) *Attorney, Agent, or Firm* — Kim and Lahey Law Firm, LLC; Seann P. Lahey

(57) ABSTRACT

A light panel replacement system for fluorescent lights comprising an LED frame; at least one LED strip carried on an interior side of said LED frame; a diffuser panel carried by said LED frame so that light emitted from said at least one LED strip is directed toward and passes through said diffuser panel; a driver carried by said LED frame for connecting to wiring of an external power source and being operatively connected to said at least one LED strip for controlling light emission of said LED strip; at least one hinge carried by said LED frame for pivotally mounting said LED frame to a base pan, whereby said LED frame is adapted for pivotally mounting to said base pan of a pre-existing fluorescent light unit to replace the fluorescent lights with at least one LED strip.

17 Claims, 5 Drawing Sheets

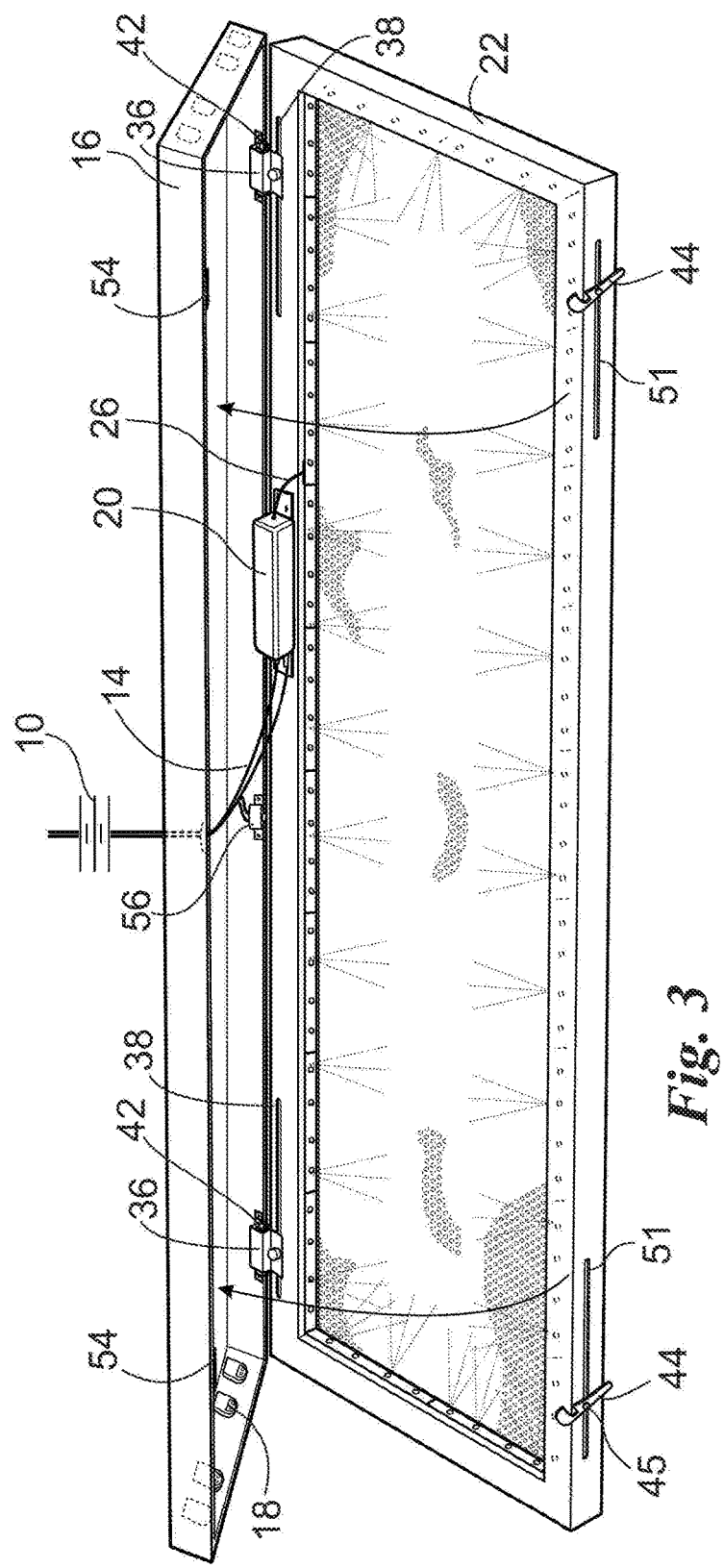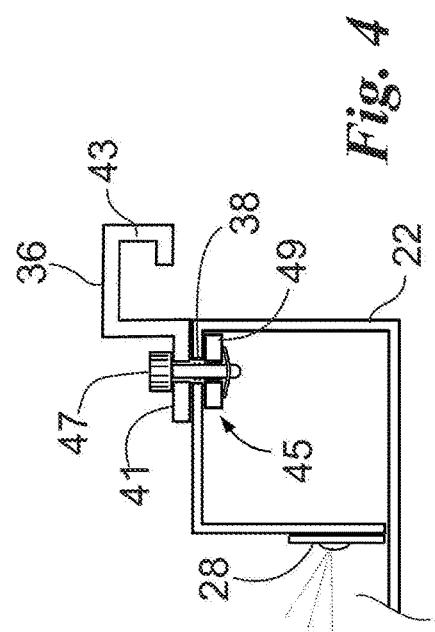

LIGHT PANEL REPLACEMENT SYSTEM FOR FLUORESCENT LIGHTS

BACKGROUND OF THE INVENTION

1) Field of the Invention

The present invention relates to LED light panels, and more particularly, to a LED light panel replacement for traditional fluorescents lighting tube systems for residential and commercial application.

2) Description of Related Art

A fluorescent lamp, well known in the art, is typically a low pressure mercury-vapor gas-discharge lamp that uses fluorescence to produce visible light. The lamp is constructed by providing a tube filled with a gas containing low pressure mercury vapor and argon, xenon, neon, or krypton. An electrical current excites vapor which results in a short-wave ultraviolet light. This UV light causes a phosphor coating on the inside of the lamp to glow providing light. Fluorescent lamp tubes are typically straight, have a rounded cross section, and have a length in the range of about 4 inches to about 8 feet. Because each lamp is an enclosed tube typically containing mercury, breaking the tube can release the mercury creating a health danger. Further, some fluorescent tubes emit UV radiation. In one study, UV radiation emitted by fluorescent lighting was found to potentially increase an individual's exposure to carcinogenic radiation by 10 to 30 percent per year which is associated with an increased probability of contracting squamous cell carcinoma. There is also evidence that flickering from fluorescent lamps can cause seizures in patients with photosensitive epilepsy, but there has yet to be any evidence to date attributing seizures to compact fluorescent lamps. Therefore, there have been attempts to replace fluorescent lamps with an economical substitute with reduced risks and equal or improved power consumption characteristics and performance.

Traditional fluorescent lighting system can include a base pan that can be attached to a ceiling, suspended from a ceiling, or attached to a suspended ceiling structure. Power wiring can be supplied through an opening in the base pan and supplied to the ballast which can be contained within the base pan. Lamp holders can be attached to the ballast so that when a fluorescent light or tube is connected to the lamp holders, power is supplied to the fluorescent light or tube. A cover plate can be attached to or carried by the base pan to cover the internal wiring and/or ballast. The lamp holders can be partially covered by the cover plate. A reflector can be carried by the base pan to reflect light from the fluorescent light or tube out of the base pan. A diffuser can be carried by the base pan and used to cover the fluorescent lights or tubes as well as to diffuse light away from the base pan. The diffuser can also be referred to as a lens. In one design, the diffuser is an open grid allowing the fluorescent lights or tubes to be at least partially exposed.

Typically, the base pan includes a hinge connection between a diffuser panel and the base pan allowing the diffuser panel to swing from an open position exposing the interior of the base pan, to a closed position covering the base pan. In the open position, the fluorescent lights or tubes can be replaced. In the closed position, the free end of the diffuser panel can include latches to secure the diffuser panel to the base pan. It would be advantageous to have an LED replacement system for fluorescent lighting fixture that did not require a complete replacement of the original parts to reduce excess waist. By keeping the existing base pan in place and only replacing the existing diffuser panel while removing unnecessary internal components such as the cover plate, fluorescent light tubes, and ballast, a large amount of waste can be prevented.

United State Patent Application Publication 2012/0320627 is directed to a flat panel light emitting diode lighting assembly and associated driving circuitry. This reference discloses a light fixture that can include a frame, a substantially flat LED panel disposed within the frame and power circuitry disposed or otherwise housed within the frame. The driver is configured to be electrically coupled to the LED panel and to an external power source using a suitable electrical connector. However, this structure may be suitable for original installations, it is not well suited to replace existing fluorescents lighting system.

United States Patent Application Publication 2010/0289428 is a lighting kit used for installation into a conventional fluorescent lighting unit having a fluorescent socket and ballast disposed in the lighting unit. The installation method of retrofitting a fluorescent housing unit involves installing a LED device in the fluorescent housing unit and mounting an LED driver in the location configured to receive a conventional fluorescent ballast. The LED lighting system includes a controller coupled to at least one LED array and mounted in a conventional fluorescent fixture or housing unit. The LED arrays are illustratively coupled to the preexisting fluorescent bulb connectors of the housing unit. This design has its limitations as the physical dimension of the fluorescent lighting unit limits the LED lighting element that can be installed.

Therefore, it is an object of the present invention to provide for a replacement lighting assembly for fluorescent lighting fixtures that utilizes the existing base pan to allow for a quick and efficient installation process with minimal waste.

It is another object of the present invention to provide for a lighting assembly that can be installed regardless of the prior position of the lights or tubes within the base pan by providing and LED frame that mounts to the pre-existing base pan in place of the prior diffuser panel.

It is another object of the present invention to provide for a lighting assembly that can be installed on a pre-existing base pan and takes advantage of the pre-existing power source wiring.

SUMMARY OF THE INVENTION

The above objectives are accomplished according to the present invention by providing a light panel replacement system for fluorescent lights comprising a base pan carried by a ceiling having a pair of vertically arranged sidewalls interconnected by a pair of vertically arranged end walls, and a top wall extending between said sidewalls and said end walls, and an aperture disposed in at least one of said top wall, said end walls or said sidewalls receiving wiring from an external power source; an LED frame having a pair of frame siderails interconnected by a pair of frame end rails; said LED frame pivotally carried by at least one of the group consisting of said sidewalls and said end walls of said base pan, and said LED frame arranged generally opposite said top wall and extending between said end walls and said sidewalls to enclose an interior space of said base pan when in a closed position and to allow access to said interior space of said base pan when pivoted to an open position; at least one LED strip carried on an interior side of said LED frame so that said at least one LED strip is disposed in said interior space of said base pan when said LED frame is in said closed position; a diffuser panel carried by said frame siderails and said frame end rails and disposed between said at least one LED strip and an exterior side of said LED frame so that light emitted from said at least one LED strip passes through said diffuser panel; and, a driver carried by at least one of the group consisting of said base pan and said LED frame; said driver being connected to said wiring of said external power source and operatively connected to said at least one LED strip for controlling light emission of said LED strip.

In a further advantageous embodiment, said LED frame includes an exterior perimeter edge and an interior perimeter edge, and said at least one LED strip is positioned to be adjacent at least said interior perimeter edge of said LED frame.

In a further advantageous embodiment, said at least one LED strip is positioned inwardly facing toward said diffuser panel so that light emitted from said at least one LED strip is directed toward said diffuser panel.

In a further advantageous embodiment, said at least on LED strip includes a plurality of operatively interconnected LED segments arranged on said LED frame.

In a further advantageous embodiment, each of said LED segments are arranged adjacent each other and operatively interconnected to form a continuous LED strip extending around the entire said LED frame.

In a further advantageous embodiment, at least one hinge track is disposed in at least one of the group consisting of said frame siderails and said frame end rails.

In a further advantageous embodiment, at least one hinge is provided engaging said hinge track for pivotally mounting said LED frame to said base pan, wherein said hinge is laterally slidable along said hinge track for repositioning said hinge to a desired location within said hinge track.

In a further advantageous embodiment, said hinge includes a first hinge portion engaging said hinge track and a second hinge portion engaging a complementary portion of at least one of the group consisting of said sidewalls and end walls of said base pan.

In a further advantageous embodiment, at least one of the group consisting of said sidewalls and end walls of said base pan includes a hinge cup receiving said second hinge portion to pivotally mount said LED frame to said base pan.

In a further advantageous embodiment, a lock unit is carried by said first hinge portion for securing said hinge at a desired location along said hinge track.

In a further advantageous embodiment, at least one latch is carried on said LED frame for engaging said base pan to secure said LED frame to said base pan in said closed position and disengaging from said base pan to allow said LED frame to move to said open position.

In a further advantageous embodiment, said latch includes a keep and a lever arm for moving said keep, and wherein said keep is received in a complementary latch opening carried by said base pan to secure said LED frame to said base pan in said closed position, and said keep is removed from said latch opening to allow said LED frame to pivot to said open position.

In a further advantageous embodiment, a latch track is disposed in at least one of the group consisting of said frame siderails and said frame end rails, wherein said latch engages said latch track and is laterally slidable along said latch track for repositioning said latch to a desired location within said latch track.

In a further advantageous embodiment, a lock unit is carried by said latch for securing said latch at a desired location along said latch track.

In a further advantageous embodiment, a cover switch is carried by at least one of the group consisting of said LED frame and said base pan, wherein said cover switch is operatively associated with said driver so that when said LED frame is in said open position said cover switch disables power to said driver, and when said LED frame is in said closed position said cover switch enables power to said driver.

The above objectives are further accomplished according to the present invention by providing a light panel replacement system for fluorescent lights comprising an LED frame having a pair of frame siderails interconnected by a pair of frame end rails, wherein said LED frame includes an exterior perimeter edge and an interior perimeter edge; at least one LED strip carried on an interior side of said LED frame, wherein said at least one LED strip is positioned to be adjacent at least said interior perimeter edge of said LED frame, and wherein said at least one LED strip is positioned inwardly facing toward a center within said frame; a diffuser panel carried by said frame siderails and said frame end rails and disposed between said at least one LED strip and an exterior side of said LED frame so that light emitted from said at least one LED strip is directed toward and passes through said diffuser panel; a driver carried by said LED frame for connecting to wiring of an external power source and being operatively connected to said at least one LED strip for controlling light emission of said LED strip; at least one hinge carried by said LED frame for pivotally mounting said LED frame to a base pan to enclose an interior space of said base pan when said LED frame is pivoted to a closed position and to allow access to said interior space of said base pan when said LED frame is pivoted to an open position, wherein said at least one LED strip and said driver are disposed in said interior space of said base pan when said LED frame is mounted in said closed position; at least one hinge track disposed in at least one of the group consisting of said frame siderails and said frame end rails; wherein said at least one hinge engages said hinge track so that said at least one hinge is laterally slidable along said hinge track for repositioning said hinge to a desired location within said hinge track; a lock unit carried by said at least one hinge for securing said hinge at a desired location along said hinge track; at least one latch carried on said LED frame for engaging said base pan to secure said LED frame to said base pan in said closed position and disengaging from said base pan to allow said LED frame to move to said open position; and, a cover switch carried by at least one of the group consisting of said LED frame and said base pan, wherein said cover switch is operatively associated with said driver so that when said LED frame is in said open position said cover switch disables power to said driver, and when said LED frame is in said closed position said cover switch enables power to said driver; whereby said LED frame is adapted for pivotally mounting to said base pan of a pre-existing fluorescent light unit to replace the fluorescent lights with at least one LED strip.

In a further advantageous embodiment, said at least on LED strip includes a plurality of operatively interconnected LED segments arranged on said LED frame, and wherein each of said LED segments are arranged adjacent each other and operatively interconnected to form a continuous LED strip extending around the entire said interior perimeter edge of said LED frame.

In a further advantageous embodiment, said hinge includes a first hinge portion engaging said hinge track and a second hinge portion adapted for engaging a hinge cup carried by said base pan for pivotally mounting said LED frame to said base pan.

In a further advantageous embodiment, said latch includes a keep and a lever arm for moving said keep, and wherein said keep is received in a complementary latch opening carried by said base pan to secure said LED frame to said base pan in said closed position, and said keep is removed from said latch opening to allow said LED frame to pivot to said open position; a latch track disposed in at least one of the group consisting of said frame siderails and said frame end rails, wherein said latch engages said latch track and is laterally slidable along said latch track for repositioning said latch to a desired location within said latch track; and, a lock unit carried by said latch for securing said latch at a desired location along said latch track.

The above objectives are further accomplished according to the present invention by providing a method for replacing a fluorescent light system comprising the steps of disconnecting the pre-existing fluorescent lighting system from an external power supply, wherein said pre-existing fluorescent lighting system includes a base pan carried by a ceiling having a pair of vertically arranged sidewalls interconnected by a pair of vertically arranged end walls, and a top wall extending between said sidewalls and said end walls, and an aperture disposed in at least one of said top wall, said end walls or said sidewalls receiving wiring from said external power source; dissembling the pre-existing fluorescent lighting system to remove pre-existing fluorescent bulbs, a ballast, a cover plate enclosing said ballast, and diffuser panel enclosing said base pan; providing an LED frame having a pair of frame siderails interconnected by a pair of frame end rails with at least one LED strip carried on an interior side of said LED frame, and a diffuser panel carried by said frame siderails and said frame end rails and disposed between said at least one LED strip and an exterior side of said LED frame so that light emitted from said at least one LED strip passes through said diffuser panel; and, pivotally mounting said LED frame to at least one of the group consisting of said sidewalls and said end walls of said base pan so that said LED frame is arranged generally opposite said top wall and extends between said end walls and said sidewalls to enclose an interior space of said base pan when in a closed position and to allow access to said interior space of said base pan when pivoted to an open position, and wherein said at least one LED strip is disposed in said interior space of said base pan when said LED frame is in said closed position; mounting a driver to at least one of the group consisting of said base pan and said LED frame; connecting said driver to said wiring of said external power source; and, connecting said driver to said at least one LED strip for controlling light emission of said LED strip.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 shows a perspective view of an LED frame pivotally mounting to a base pan of the pre-existing fluorescent light panel system and operable between an open position and a closed position according to the present invention;

FIG. 4 shows a cross-section view of a portion of the LED frame and the locking unit securing the hinge in the hinge track; and, FIG. 5 shows a flowchart of an installation process for replacing a pre-existing fluorescent light system according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Figure 1A:
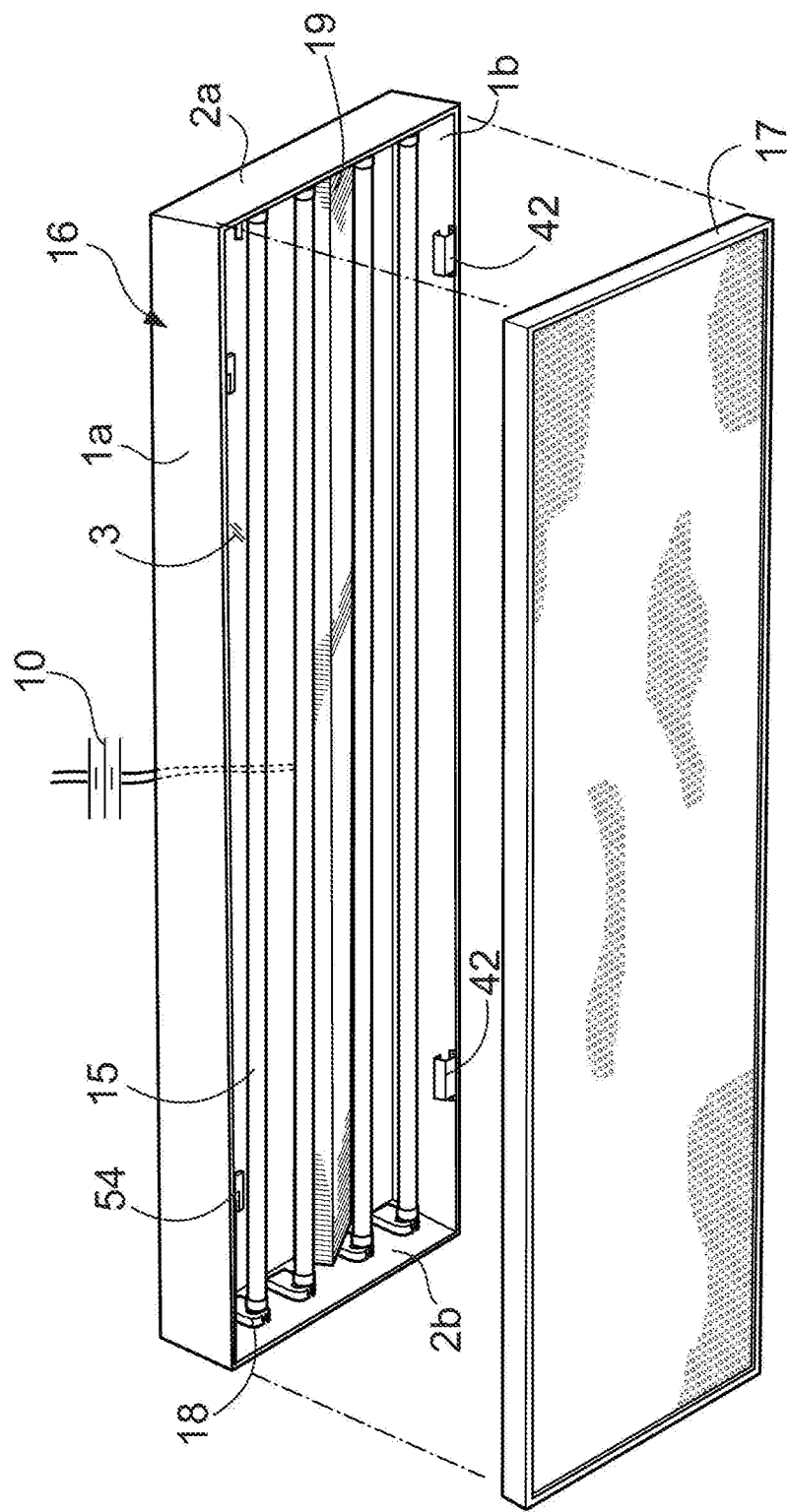
FIGS. 1A and 1B show an exploded perspective view of a pre-existing fluorescent light panel system with selective component removal.
Figure 1B:
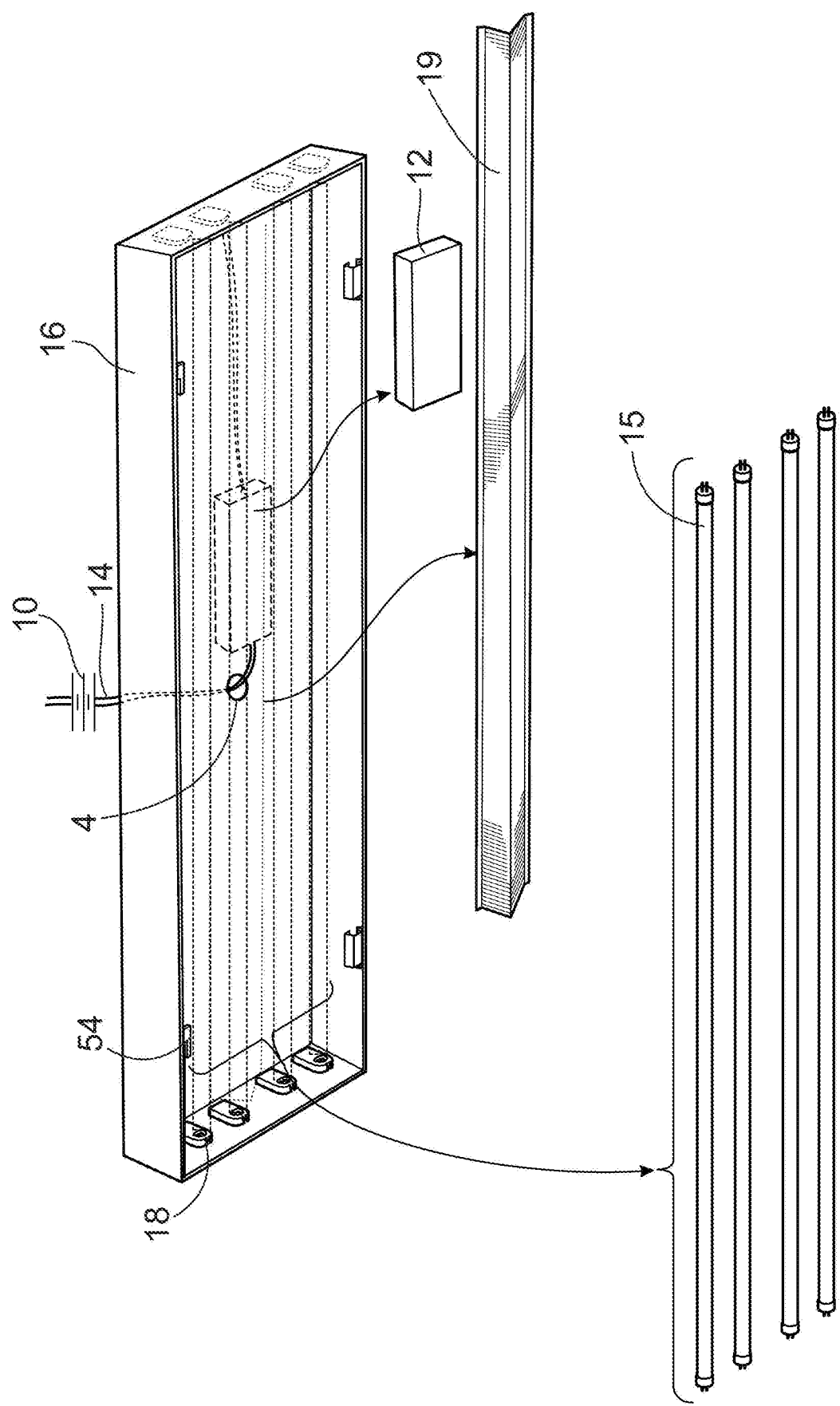

Referring to FIGS. 1A and 1B, a pre-existing fluorescent light system is shown for modification according to the present invention. The pre-existing fluorescent light system includes an external power source 10 originally connected to ballast 12. The external power source can deliver power using wires 14 that can extend through a base pan 16. The base pan includes a pair of vertically arranged sidewalls 1a and 1b, interconnected by a pair of vertically arranged end walls 2a and 2b, and a top wall 3 extending between the sidewalls and end walls, and an aperture 4 disposed in the said top wall receiving wiring from an external power source. The base pan 16 is attached to a ceiling or suspended ceiling structure. The original diffuser cover 17 is removed from the base pan 16. The original fluorescent tubes 15 are removed from the lamp holders 18.

Figure 2:
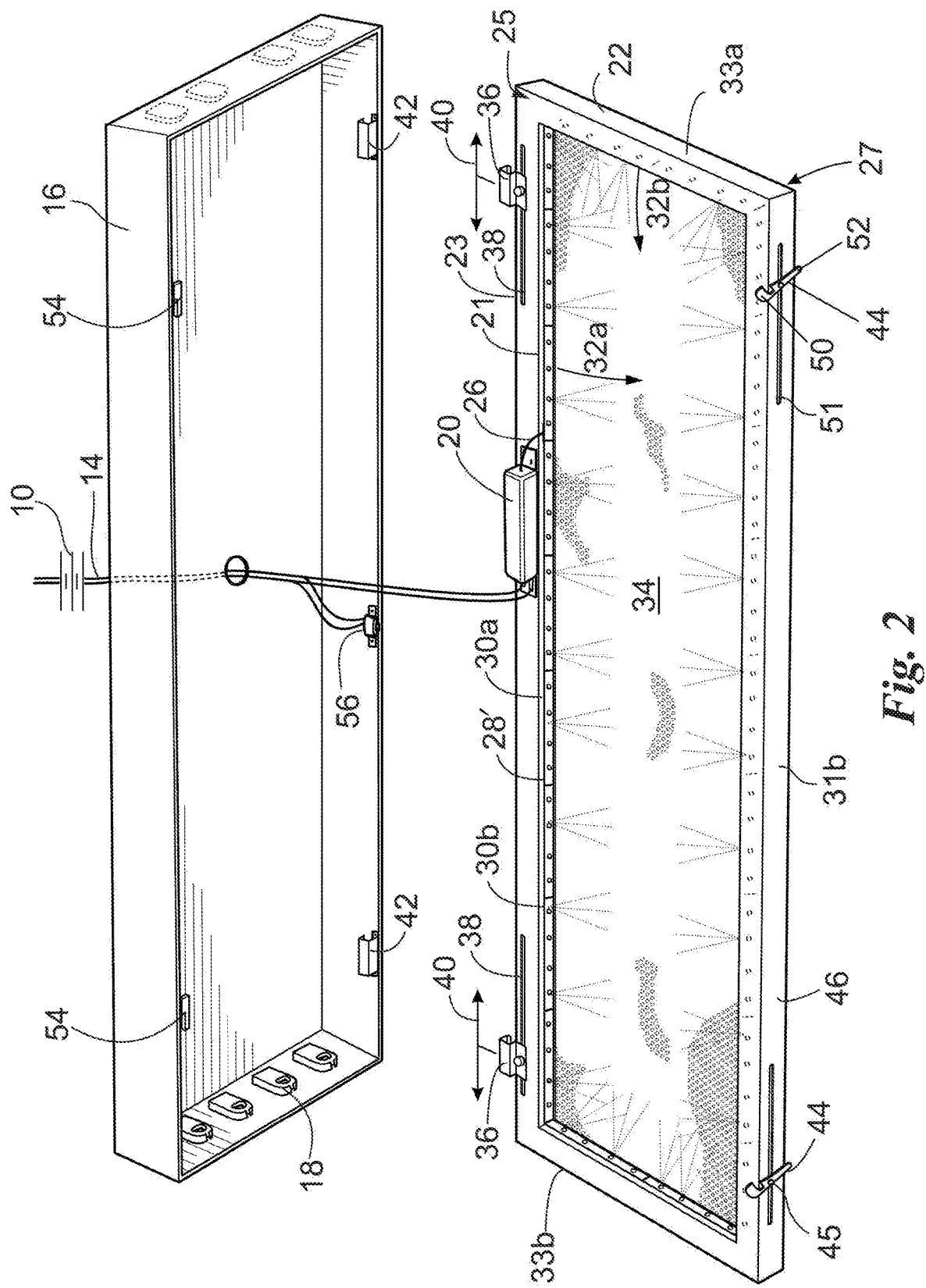
FIG. 2 shows an exploded perspective view of an LED frame for pivotally mounting to a base pan of the pre-existing fluorescent light panel system according to the present invention.

With further reference to FIG. 2, the external power wires 14 that extend through the base pan 16 can be cut and attached to a driver 20 that is carried by an LED frame 22 and operatively associated with at least one LED strip 28 as detailed herein for controlling light emission of the LED strip. In one configuration, driver 20 may alternatively be attached to the base pan 16. A cover plate 19 is typically provided that covers ballast 12 and is removably attached to the base pan 16. When the cover plate 19 is attached to the base pan 16, driver 20 can be disposed under the cover plate 19 when mounted to the base pan 16. Optionally, cover plate 19 may be discarded. The ballast 12 can be removed once the wires 14 from the external power source that extend through the base pan 16 are disconnected from ballast 12. Once the fluorescent lights, cover plate, and ballast are removed, the base pan effectively operates as a large electrical box to which the LED frame is then mounted. In the illustrated embodiment of FIGS. 2 and 3, LED frame 22 is pivotally carried by one of the sidewalls of base pan 16 and arranged generally opposite top wall 3 so that LED frame 22 extends between the end walls and sidewalls to enclose an interior space of base pan 16 when in a closed position and to allow access to an interior space of base pan 16 when pivoted to an open position. In this arrangement, reusing the base pan saves a large amount of waste and allows for a quicker, more efficient installation, by not having to completely replace and rewire a new fixture to the ceiling.

Referring to FIG. 2, LED wiring 26 connects driver 20 to one or more LED strips 28 that can be disposed on LED frame 22. The LED frame 22 has a pair of frame siderails 31a and 31b interconnected by a pair of frame end rails 33a and 33b. In the illustrated embodiment, an LED strip 18 is carried on an interior side 25 of the LED frame 22. When the driver 20 is attached to the base pan 16, the LED wiring 26 can be of sufficient length to connect driver 20 to the LED strips 28 and allowing the LED frame 22 to be disposed a distance from the base pan 16. In the illustrated embodiment, the LED strip 28 includes a plurality of segments, for example segments 30a and 30b, that are connected and generally encircle the interior side of the LED frame 22 generally around an interior perimeter edge 21 of LED frame 22 to form a continuous LED strip around the entire interior side 25 of LED frame 22. Alternatively, a single continuous LED strip may be provided on LED frame 22. The LED strips 28 are preferably arranged around the interior perimeter edge 21 of LED frame 22 with each LED on the LED strip 28 facing inwardly in a direction 32a and 32b, for example, so that hot spots can be reduced or eliminated projecting from the LED frame 22 and the light emitted is directed toward a diffuser panel. Accordingly, a diffuser panel 34 is carried within the LED frame 22 and disposed between the LED strip 28 and an exterior side 27 of the LED frame 22 to diffuse LED light projecting from the LED strip 28.

In the illustrated embodiment, LED frame 22 includes a hinge 36 that is slidably carried in a hinge track 38 allowing the hinge 36 to travel laterally along path 40 of hinge track 38. Hinge track 38 is disposed in frame siderail 31a. In the illustrated embodiment, a pair of hinge tracks are provide for carrying hinges 36. This structure allows the hinge 36 to be adjusted to attach to a complementary receiving hinge cup 42 carried by the base pan 16 providing adjustability to the LED frame 22 to attach to a number of base pans 16 independent of the actual location of the hinge cup 42. The hinge 36 and hinge cup 42 are cooperatively associated so that the LED frame 22 can be attached to and removed from the base plate 16, while allowing LED frame to be pivotally connected to base pan 16. One or more hinge 36 and hinge cup 42 combinations can be used to secure the LED frame 22 to the base pan 16. The hinges 36 are removably carried by the LED frame 22 to accommodate varying numbers of hinge cups 42 in the base pan 16.

Referring to FIG. 4, in the illustrated embodiment, hinge 36 includes a first hinge portion 41 engaging hinge track 38 and a second hinge portion 43 adapted for engaging a complementary portion of the sidewall or end wall of base pan 16. As shown in FIG. 3, second hinge portion 43 is a "c" shaped bracket that engages a complementary shaped hinge cup 42. A lock unit 45 is carried by first hinge portion 41 for securing hinge 36 at a desired location along hinge track 38. As shown in FIG. 4, lock unit 45 includes a set screw 47 that extends through first hinge portion 41 and into hinge track 38. Set screw 47 is received by a securing washer 49 so that turning set screw 47 causes securing washer 49 to clamp against LED frame walls defining hinge track 38 to hold hinge 36 in position along hinge track 38.

In one alternative embodiment, the base pan 16 carries the hinge 36. In this configuration, the hinge track 38 is configured to receive the hinge 36 from the base pan 16. The hinge 36 can then be disposed along the LED frame 22 so that hinge 36 in varying positions can be accommodated and secure the LED frame 22 to the base pan 16. In a further alternative arrangement, hinge 36 may include a spring load clamp mounted to base pan 16 so that as LED frame 22 is pressed into the spring load clamp it compresses against the LED frame 22 to pivotally mount the LED frame 22 to base pan 16. Various other types of hinges, brackets and clamps can be used to pivotally mount LED frame 22 to base pan 16 as is understood by those skilled in the art and as such the present invention is not limited to the illustrated embodiments as detailed herein which are provided by way of examples only.

Referring to FIGS. 2 and 3, a latch 44 is rotatably carried on an edge portion 46 of LED frame 22 on an opposite side relative to hinge track 38. The latch 44 includes a keep 50 and lever 52. Latch 44 is operable between an open position in which keep 50 is removed from a latch opening 54 in base pan 16, and a closed position in which keep 50 is received in latch opening 54 to secure the opposite side of LED frame 22 to base pan 16. Accordingly, as best shown in FIG. 3, LED frame 22 is pivotable between closed and open positions on base pan 16 based on latch 44 engaging and disengaging latch opening 54.

In the illustrated embodiment of FIGS. 2 and 3, a latch track 51 is disposed in edge portion 46 of frame siderail 31b. Latch 44 engages latch track 51 and is laterally slidable along latch track 51 for repositioning said latch to a desired location within latch track 51 in the same manner that hinge 36 is slidable along hinge track 38 for accommodating various locations of latch openings 54 carried by base pan 16. Wither further reference to FIG. 4, latch 44 includes a lock unit 45 the same as for hinge 36 for securing latch 44 at a desired location along latch track 51.

Referring to FIGS. 2 and 3, the circuit between the external power source 10, driver 20, and LED strip(s) 28 can include a cover switch 56 so that when the LED frame 22 is in the open position, power is not provided to driver 20 and in turn the LED strips 28. The cover switch 56 can be a contact switch placed in the closed position, closing the circuit, when LED frame 22 is in the closed position and placed in an open position, opening the circuit, when the LED frame 22 is in the open position. The cover switch 56 can also be attached to the LED frame 22 or base pan 16 as illustrated. The cover switch may be, for example, a contact switch or magnetic switch.

Figure 5:
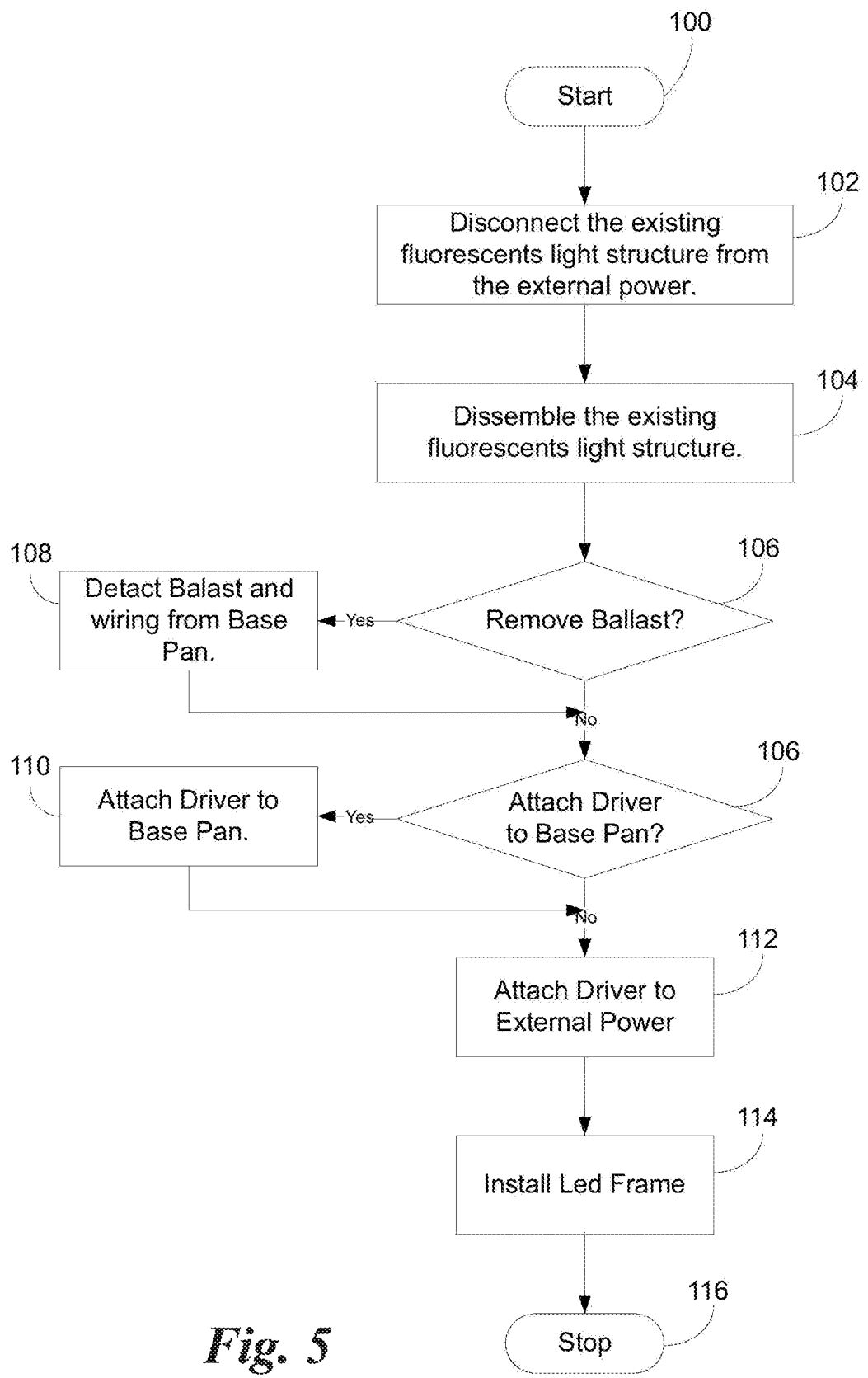

Referring to FIG. 5, the method of retrofitting a fluorescents lighting system is shown starting with step 100. After insuring that the external power if off, the external power 10 is disconnected from the original fluorescents system at 102 by cutting wires or otherwise disconnecting the external power source 10. The original fluorescents system is then removed at 104 by removing the original diffuser cover, the fluorescent tubes, cover plate, and ballast 12 if needed at 106 and 108. Extra wires can be removed from the system as well. The external power source wires 14 should be extended through the base pan 16. In certain circumstances, the base pan 16 can be replaced with a new base pan 16 if the original base pan is of insufficient dimensions, it is damaged, or otherwise not serviceable.

If the driver 20 is to be connected to the base pan 16 or other location away from the LED frame 22 at 110, the driver 20 is accordingly attached at 110. The driver 20 is connected to the external power source at 112. When the driver 20 is pre-attached to the LED frame 22, the LED frame 22 may need to be attached to the base pan 16 prior to attaching the driver 20 to the external power source 10 to ensure sufficed wiring length for a proper connection. The LED frame 22 can be attached to the base pan 16 at 114. The LED frame 22 can be pivotally attached to the base pan 16 or otherwise connected to the base pan 16 such as through snaps, clips, hooks, clamps, and the like, for example via hinge 36 and hinge cups 42. Once the LED frame 22 is connected to the external power source 10 and the base pan 16, the process can be completed at 116 by moving the LED frame 22 into a closed position with base pan 16.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A light panel replacement system for fluorescent lights comprising:
    a base pan carried by a ceiling having a pair of vertically arranged sidewalls interconnected by a pair of vertically arranged end walls, and a top wall extending between said sidewalls and said end walls, and an aperture disposed in at least one of said top wall, said end walls or said sidewalls receiving wiring from an external power source;
    an LED frame having a pair of frame siderails interconnected by a pair of frame end rails; said LED frame pivotally carried by at least one of the group consisting of said sidewalls and said end walls of said base pan, and said LED frame arranged generally opposite said top wall and extending between said end walls and said sidewalls to enclose an interior space of said base pan when in a closed position and to allow access to said interior space of said base pan when pivoted to an open position;
    at least one LED strip carried on an interior side of said LED frame so that said at least one LED strip is disposed in said interior space of said base pan when said LED frame is in said closed position;
    a diffuser panel carried by said frame siderails and said frame end rails and disposed between said at least one LED strip and an exterior side of said LED frame so that light emitted from said at least one LED strip passes through said diffuser panel; and,
    a driver carried by at least one of the group consisting of said base pan and said LED frame; said driver being connected to said wiring of said external power source and operatively connected to said at least one LED strip for controlling light emission of said LED strip;
    at least one hinge track disposed in at least one of the group consisting of said frame siderails and said frame end rails; and,
    at least one hinge engaging said hinge track for pivotally mounting said LED frame to said base pan, wherein said hinge is laterally slidable along said hinge track for repositioning said hinge to a desired location within said hinge track.

2. The light panel replacement system of claim 1 wherein said LED frame includes an exterior perimeter edge and an interior perimeter edge, and wherein said at least one LED strip is positioned to be adjacent at least said interior perimeter edge of said LED frame.

3. The light panel replacement system of claim 1 wherein said at least one LED strip is positioned inwardly facing toward said diffuser panel so that light emitted from said at least one LED strip is directed toward said diffuser panel.

4. The light panel replacement system of claim 1 wherein said at least on LED strip includes a plurality of operatively interconnected LED segments arranged on said LED frame.

5. The light panel replacement system of claim 4 wherein each of said LED segments are arranged adjacent each other and operatively interconnected to form a continuous LED strip extending around the entire said LED frame.

6. The light panel replacement system of claim 1 wherein said hinge includes a first hinge portion engaging said hinge track and a second hinge portion engaging a complementary portion of at least one of the group consisting of said sidewalls and end walls of said base pan.

7. The light panel replacement system of claim 6 wherein at least one of the group consisting of said sidewalls and end walls of said base pan includes a hinge cup receiving said second hinge portion to pivotally mount said LED frame to said base pan.

8. The light panel replacement system of claim 6 including a lock unit carried by said first hinge portion for securing said hinge at a desired location along said hinge track.

9. The light panel replacement system of claim 1 including at least one latch carried on said LED frame for engaging said base pan to secure said LED frame to said base pan in said closed position and disengaging from said base pan to allow said LED frame to move to said open position.

10. The light panel replacement system of claim 9 wherein said latch includes a keep and a lever arm for moving said keep, and wherein said keep is received in a complementary latch opening carried by said base pan to secure said LED frame to said base pan in said closed position, and said keep is removed from said latch opening to allow said LED frame to pivot to said open position.

11. The light panel replacement system of claim 9 including a latch track disposed in at least one of the group consisting of said frame siderails and said frame end rails, wherein said latch engages said latch track and is laterally slidable along said latch track for repositioning said latch to a desired location within said latch track.

12. The light panel replacement system of claim 11 including a lock unit carried by said latch for securing said latch at a desired location along said latch track.

13. The light panel replacement system of claim 1 including a cover switch carried by at least one of the group consisting of said LED frame and said base pan, wherein said cover switch is operatively associated with said driver so that when said LED frame is in said open position said cover switch disables power to said driver, and when said LED frame is in said closed position said cover switch enables power to said driver.

14. A light panel replacement system for fluorescent lights comprising:
an LED frame having a pair of frame siderails interconnected by a pair of frame end rails, wherein said LED frame includes an exterior perimeter edge and an interior perimeter edge;
at least one LED strip carried on an interior side of said LED frame, wherein said at least one LED strip is positioned to be adjacent at least said interior perimeter edge of said LED frame, and wherein said at least one LED strip is positioned inwardly facing toward a center within said frame;
a diffuser panel carried by said frame siderails and said frame end rails and disposed between said at least one LED strip and an exterior side of said LED frame so that light emitted from said at least one LED strip is directed toward and passes through said diffuser panel;
a driver carried by said LED frame for connecting to wiring of an external power source and being operatively connected to said at least one LED strip for controlling light emission of said LED strip;
at least one hinge carried by said LED frame for pivotally mounting said LED frame to a base pan to enclose an interior space of said base pan when said LED frame is pivoted to a closed position and to allow access to said interior space of said base pan when said LED frame is pivoted to an open position, wherein said at least one LED strip and said driver are disposed in said interior space of base pan when said LED frame is mounted in said closed position;
at least one hinge track disposed in at least one of the group consisting of said frame siderails and said frame end rails; wherein said at least one hinge engages said hinge track so that said at least one hinge is laterally slidable along said hinge track for repositioning said hinge to a desired location within said hinge track;
a lock unit carried by said at least one hinge for securing said hinge at a desired location along said hinge track;
at least one latch carried on said LED frame for engaging said base pan to secure said LED frame to said base pan in said closed position and disengaging from said base pan to allow said LED frame to move to said open position; and,
a cover switch carried by at least one of the group consisting of said LED frame and said base pan, wherein said cover switch is operatively associated with said driver so that when said LED frame is in said open position said cover switch disables power to said driver, and when said LED frame is in said closed position said cover switch enables power to said driver;
whereby said LED frame is adapted for pivotally mounting to said base pan of a pre-existing fluorescent light unit to replace the fluorescent lights with at least one LED strip.

15. The light panel replacement system of claim 14 wherein said at least on LED strip includes a plurality of operatively interconnected LED segments arranged on said LED frame, and wherein each of said LED segments are arranged adjacent each other and operatively interconnected to form a continuous LED strip extending around the entire said interior perimeter edge of said LED frame.

16. The light panel replacement system of claim 15 wherein said hinge includes a first hinge portion engaging said hinge track and a second hinge portion adapted for engaging a hinge cup carried by said base pan for pivotally mounting said LED frame to said base pan.

17. The light panel replacement system of claim 14 wherein said latch includes a keep and a lever arm for moving said keep, and wherein said keep is received in a complementary latch opening carried by said base pan to secure said LED frame to said base pan in said closed position, and said keep is removed from said latch opening to allow said LED frame to pivot to said open position;
a latch track disposed in at least one of the group consisting of said frame siderails and said frame end rails, wherein said latch engages said latch track and is laterally slidable along said latch track for repositioning said latch to a desired location within said latch track; and,
a lock unit carried by said latch for securing said latch at a desired location along said latch track.

* * * * *